(12) United States Patent
Riera et al.

(10) Patent No.: US 10,802,684 B2
(45) Date of Patent: Oct. 13, 2020

(54) REMOTE CONTROL OF AN ELECTRONIC DEVICE WITH A SELECTABLE ELEMENT

(71) Applicant: ORANGE, Paris (FR)

(72) Inventors: Julien Riera, Issy les Moulineaux (FR); Lukasz Roth, Bielsko-Biala (PL)

(73) Assignee: ORANGE, Paris (FR)

( * ) Notice: Subject to any disclaimer, the term of this patent is extended or adjusted under 35 U.S.C. 154(b) by 246 days.

(21) Appl. No.: 15/740,205

(22) PCT Filed: Jun. 27, 2016

(86) PCT No.: PCT/IB2016/001071
§ 371 (c)(1),
(2) Date: Dec. 27, 2017

(87) PCT Pub. No.: WO2017/001932
PCT Pub. Date: Jan. 5, 2017

(65) Prior Publication Data
US 2018/0188915 A1     Jul. 5, 2018

(30) Foreign Application Priority Data
Jun. 30, 2015  (EP) ..................................... 15306045

(51) Int. Cl.
*G06F 3/0484*     (2013.01)
*G06F 16/9535*    (2019.01)
(Continued)

(52) U.S. Cl.
CPC .......... *G06F 3/0484* (2013.01); *G06F 3/0482* (2013.01); *G06F 16/9535* (2019.01);
(Continued)

(58) Field of Classification Search
CPC .................................. G06F 12/08; G06F 3/167
See application file for complete search history.

(56) References Cited

U.S. PATENT DOCUMENTS 7,155,213  B1    12/2006  Almeda et al.
10,204,618 B2     2/2019  Dong et al.
(Continued)

OTHER PUBLICATIONS

Notice of Allowance dated Jul. 2, 2019 from the United States Patent and Trademark Office for corresponding U.S. Appl. No. 15/740,212, filed Dec. 27, 2017.
(Continued)

*Primary Examiner* — Rayeez R Chowdhury
(74) *Attorney, Agent, or Firm* — David D. Brush; Westman, Champlin & Koehler, P.A.

(57) ABSTRACT

A method for managing a remote electronic device using an electronic device. A database associates argument types with alternative argument values and includes a compatibility mesh between the alternative argument values for a given type and contextual data. The method includes: upon reception of a first user input, detecting at least one argument type in the first user input and contextual data; retrieving from the database the alternative argument values corresponding to the detected argument type; outputting a graphical instruction, the graphical instruction comprising a selectable element representing the detected argument type; upon detection of a second user input on the selectable element for selection of an alternative argument value, outputting retrieved alternative argument values being filtered using the compatibility mesh and the contextual data; and upon selection of one argument value, providing an instruction to the remote electronic device based on the selected argument value.

11 Claims, 5 Drawing Sheets

(51) Int. Cl.
  *G08C 17/00* (2006.01)
  *H05B 47/175* (2020.01)
  *G06F 3/0482* (2013.01)

(52) U.S. Cl.
  CPC .......... *G08C 17/00* (2013.01); *H05B 47/175* (2020.01); *G08C 2201/30* (2013.01); *G08C 2201/91* (2013.01)

(56) References Cited

U.S. PATENT DOCUMENTS

| | | | |
|---|---|---|---|
| 10,241,753 B2 | 3/2019 | Alleaume et al. | |
| 2008/0034081 A1* | 2/2008 | Marshall | G08C 17/02 709/223 |
| 2008/0062141 A1 | 3/2008 | Chandhri | |
| 2011/0313775 A1 | 12/2011 | Laligand et al. | |
| 2012/0030712 A1 | 2/2012 | Chang | |
| 2014/0040748 A1 | 2/2014 | Lemay et al. | |
| 2014/0167931 A1* | 6/2014 | Lee | H04L 12/2818 340/12.5 |
| 2015/0040012 A1 | 2/2015 | Faaborg et al. | |
| 2015/0261496 A1* | 9/2015 | Faaborg | G10L 15/00 715/728 |
| 2015/0304171 A1 | 10/2015 | Kim et al. | |
| 2016/0154576 A1 | 6/2016 | Moore et al. | |
| 2016/0364161 A1 | 12/2016 | Han | |

OTHER PUBLICATIONS

International Search Report dated Oct. 14, 2016 for corresponding International Application No. PCT/IB2016/001071, filed Jun. 27, 2016.
Written Opinion of the International Searching Authority dated Oct. 14, 2016 for corresponding International Application No. PCT/IB2016/001071, filed Jun. 27, 2016.
International Search Report dated Sep. 28, 2016 for International Application No. PCT/IB2016/001070, filed Jun. 27, 2016.
Office Action dated Dec. 28, 2018 from the United States Patent and Trademark Office for corresponding U.S. Appl. No. 15/740,212, filed Dec. 27, 2017.

* cited by examiner

REMOTE CONTROL OF AN ELECTRONIC DEVICE WITH A SELECTABLE ELEMENT

CROSS-REFERENCE TO RELATED APPLICATIONS

This Application is a Section 371 National Stage Application of International Application No. PCT/IB 2016/001071, filed Jun. 27, 2016, the content of which is incorporated herein by reference in its entirety, and published as WO2017/001932 on Jan. 5, 2017, in English.

FIELD OF THE DISCLOSURE

The present invention generally relates to the control of remote electronic devices, such as connected objects for example.

It finds applications in electronic devices such as laptops, touchpads, mobile phones, Smartphones, wearable devices or smart watches.

In what follows, we consider, for illustrative purpose exclusively, electronic devices as mobile phones and remote electronic devices as connected objects.

Connected objects can be remotely controlled by mobile phones, for example by means of an application installed in the mobile phones providing a user interface.

It is meant by "connected object" any object able to perform a given function, according to optional parameters, and comprising a network interface to access an access point, thereby accessing a remote server (through a network such as the internet for example or a local Bluetooth network) or to receive commands from a mobile phone (or any electronic device).

For example, a connected coffee machine can perform basic functions such as "switch on" and "switch off". However, "switch on" can encompass several functions such as "prepare a latte coffee", "prepare an expresso", "prepare a cappuccino". In addition, each device and function can also be associated with parameters. For example, the parameters can be a volume of the coffee to be prepared. The parameters may therefore comprise "2 centilitres", "5 centilitres", etc.

BACKGROUND OF THE DISCLOSURE

Electronic devices such as mobile phones that are used to remotely control connected objects now provide several ways to receive a user input and to turn it into an instruction for a remote connected objet: touch display, keypad, microphone coupled with a speech-to-text application, etc.

The user therefore needs to indicate information that enables the mobile phone to generate an instruction for the remote connected object.

Such information can be communicated using complementary arguments of different types:
- a device identifier to identify the connected objet to be controlled or the group of connected objects to be controlled;
- a function identifier to identify the function to be performed by the identified connected object;
- optionally, a parameter identifier identifying a parameter of the identified function to be performed by the identified connected objet.

To indicate this information, arguments can be included in a user input such as a sentence "could you switch-on the bedroom light in blue". This sentence comprises three arguments, of different types: a device identifier having the value "bedroom light", a function identifier having the value "switch-on" and a parameter identifier having the value "blue".

However, electronic devices have input interfaces such as small touch screens, which are subject to errors. This is even more problematic in case of a user input including a microphone and a speech-to-text application. Correction of a user input generally requires selecting then cancelling an input argument to replace it with a new one.

The user may also want to modify an argument value obtained from a first input. To this end, the user has to reselect the argument, cancel it and input a new argument value, which is cumbersome and time consuming for the user.

The document US 2008/034081 discloses a method including remotely controlling wirelessly networked devices via a mobile unit.

SUMMARY

There is a need to facilitate modification of correction of a user input on an electronic device used for remotely controlling other electronic devices such as connected objects.

To address this need, a first aspect of the invention concerns a method for managing a remote electronic device using a user interface on an electronic device, the electronic device being operatively connected to a database associating argument types with alternative argument values, the database further comprising a compatibility mesh between the alternative argument values for a given type and contextual data. The method comprises:
- upon reception of a first user input through the user interface on the electronic device, detecting at least one argument type in said first user input and contextual data;
- retrieving from the database the alternative argument values corresponding to the detected argument type;
- outputting a graphical instruction representing the first user input, said graphical instruction comprising a selectable element representing the detected argument type;
- upon detection of a second user input on the selectable element for selection of an alternative argument value, outputting retrieved alternative argument values being filtered using the compatibility mesh and the contextual data;
- upon selection of one argument value among the filtered alternative arguments values, providing an instruction to the remote electronic device based on the selected argument value.

It is meant by "compatibility mesh", any data structure that links elements that are compatible together. Based on a given element, it is possible to retrieve all the other elements that are linked to this given element in the compatibility mesh.

The remote electronic device can refer to a connected object or alternatively to a group of connected objects.

The present invention enables to facilitate the correction or modification of a user instruction to an electronic device such as a connected object. Having a selectable element showing alternative argument values that are filtered renders a correction or modification of an argument value easier and quicker to the user.

According to some embodiments, the contextual data may comprise information acquired by at least one sensor, information input by the user or information retrieved from an external entity.

Therefore, the filtering performed according to the method enables to provide only relevant alternative argument values to the user.

In complement, the contextual data can comprise at least one among:
location data of the user;
weather forecast data;
temperature data; or
other information acquired by a sensor, retrieved from an external entity, communicated by the user or retrieved from a user profile.

These contextual data enable to improve the accuracy of the filtering performed on the alternative argument values.

According to some embodiments of the invention, a first argument type can be a device identifier, the database can store access rights of users for the alternative argument values of the first argument type. When the first argument type is detected in the first user input, the method can further comprise identifying the user. The graphical instruction can comprise a selectable element representing the detected first argument type and the retrieved alternative argument values can be filtered using the compatibility mesh, the contextual data and the access rights of the identified user.

This enables to improve the security of the method, as only the identified/authenticated user is allowed to remotely control his electronic devices.

According to some embodiments of the invention, in the compatibility mesh between the alternative argument values for a given type and contextual data, the contextual data may comprise argument values of another argument type. Upon reception of the first user input, at least a first argument type and a second argument type can be detected with contextual data, and the method may further comprise obtaining a first argument value for the first argument type. Alternative argument values corresponding to the second argument type can be retrieved. The graphical instruction can comprise the first argument value and a selectable element representing the detected second argument type. The retrieved alternative argument values can be filtered using the compatibility mesh for the second argument type and the contextual data.

The accuracy of the filtering performed on the alternative argument values is therefore improved.

In complement, the first argument type can be a device identifier identifying the remote electronic device, and the second argument type can be a function identifier or a parameter identifier.

Therefore, only the functions that can be performed by the selected device are allowed after the filtering step. A device identifier may also identify a group of electronic devices. For example, the device identifier "all the lights" refer to the group of lights of the user.

Alternatively or in complement, a third argument type can be detected in the user input, the second argument type can be a function identifier and the third argument type can be a parameter identifier.

This enables to enrich the user instruction to remotely control the electronic devices.

According to some embodiments of the invention, the compatibility mesh can be configurable by the user. Alternatively, the compatibility mesh can be configurable by another person than the user (for example a parent in case the user is a child, or any person being entitled to manage the compatibility mesh of the user). The compatibility mesh may also be configurable by a manufacturer of some of the connected objects, or by the service platform 14.

A second aspect of the invention concerns a computer program product comprising a computer readable medium having stored thereon computer program instructions loadable into a computing device and adapted to—when loaded into and executed by said computing device—cause the computing device to perform a method according to the first aspect of the invention.

A third aspect of the invention concerns an electronic device for managing a remote electronic device using a user interface on the electronic device, the electronic device being operatively connected to a database associating argument types with alternative argument values, database further comprising a compatibility mesh between the alternative argument values for a given type and contextual data, the electronic device comprising:

a user interface for receiving user inputs;
a processor configured to perform the following steps:
upon reception of a first user input on the user interface, detecting at least one argument type in said first user input and contextual data;
retrieving from the database the alternative argument values corresponding to the detected argument type;
outputting a graphical instruction representing the first user input, said graphical instruction comprising a selectable element representing the detected argument type;
upon detection of a second user input on the selectable element for selection of an alternative argument value, outputting retrieved alternative argument values being filtered using the compatibility mesh and the contextual data;
upon selection of one argument value among the filtered alternative arguments values, providing an instruction to the first electronic device based on the selected argument value.

A fourth aspect of the invention concerns a system comprising the electronic device according to the third aspect of the invention and a database associating argument types with alternative argument values, said database further comprising a compatibility mesh between the alternative argument values for a given type and contextual data.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF ILLUSTRATIVE EMBODIMENTS

Figure 1:
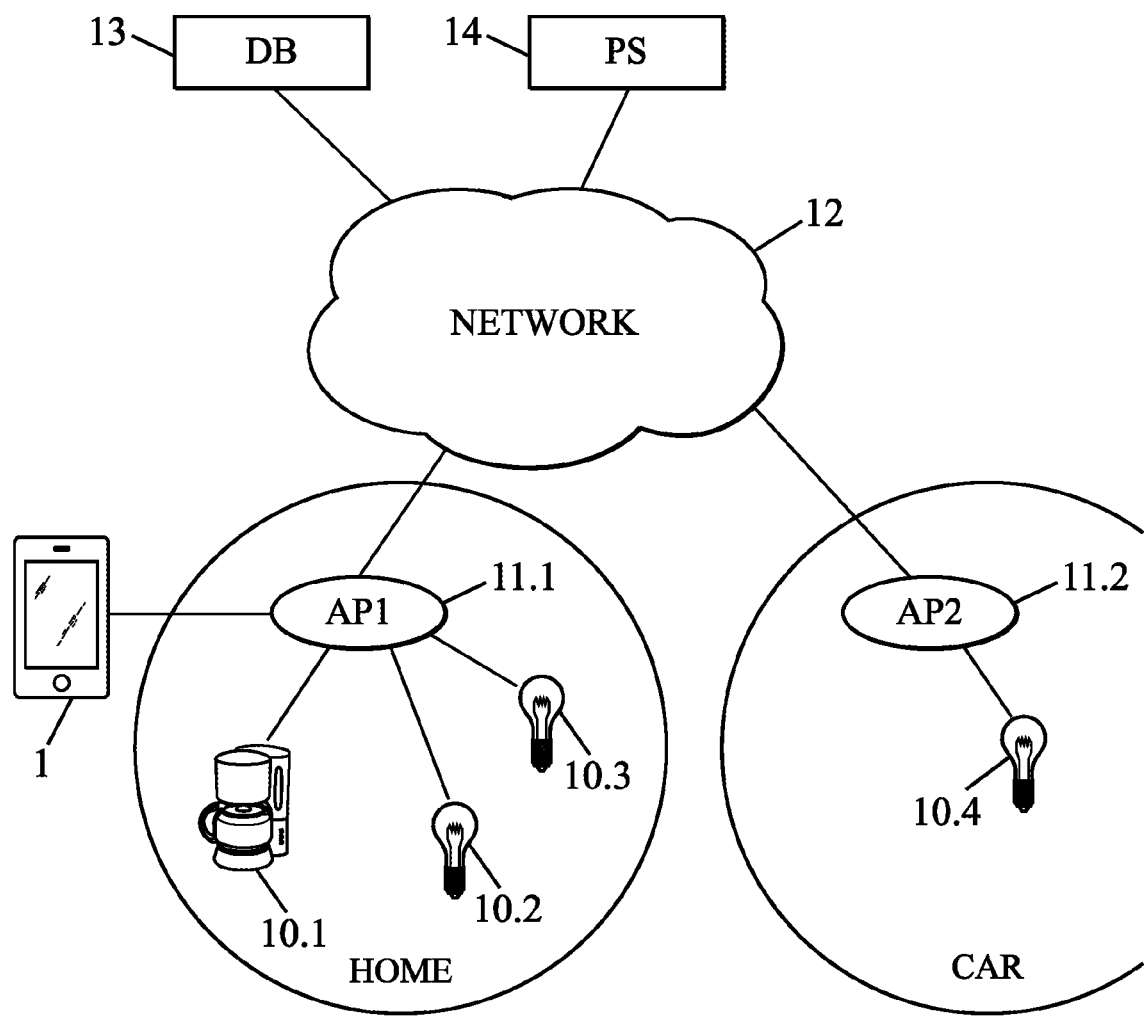
FIG. 1 represents a system according to some embodiments of the invention.

FIG. 1 illustrates a system according to some embodiments of the invention.

The system comprises an electronic device 1 such as a user terminal. As illustrated on FIG. 1, the electronic device 1 can be a mobile phone such as a Smartphone. The invention is not limited to this illustrative example, and also encompasses touch pads, laptops, desktop computers, etc.

The electronic device 1 can be used by the user to control remote electronic devices such as connected objects. In what follows, "remote electronic devices" are called "connected objects", for illustrative purposes.

The user of the electronic device 1 (also called "user terminal 1" hereafter) may have several connected objects located in different places:

a connected coffee machine 10.1 located at home;
a bedroom light 10.2 located at home;
a kitchen light 10.3 located at home;
a car light 10.4 located in a car.

Connected objects 10.1-10.3 are configured to access to a first access point 11.1 and connected objet 10.4 is configured to access to a second access point 11.2. No restriction is attached to the access technology used by the connected objects: wired or wireless means can be envisaged. In what follows, we consider the first and second access points as being Wi-fi access points.

Through the access points 11.1 and 11.2, the connected objects can access a network 12, such as the internet or a local Bluetooth network, and communicate with a remote service platform 14, for example to upload events or to receive instructions. Alternatively, the network 12 can be a local Bluetooth network and the remote service platform 14 is replaced by a local management entity. Several respective service platforms can also be envisaged for the different connected objects 10.1 to 10.4, and a unique service platform 14 has been represented for illustrative purposes exclusively.

The service platform 14 can also be accessed by the user terminal 1. For example, the user terminal can connect the access point 11.1 when the user is at home. Alternatively, the user may use a 3G/4G mobile network to access the service platform 14 with the user terminal 1.

An application dedicated to the service platform can be installed on the user terminal 1. Through this application, the user may enter user inputs that are converted to instructions. The instructions can then be used to control the connected objects 10.1-10.4. To this end, the instructions may be forwarded to the service platform 14, which then forwards (and optionally modifies or enriches) the instructions the targeted connected objects 10.1-10.4.

The user terminal 1 is also operatively connected to a database 13. On FIG. 1, the database 13 can be accessed through the network 12. Alternatively, the database 13 can be stored in the user terminal 1 or can be integrated in the service platform 14.

As detailed hereafter, the database 13 stores associations between argument types and alternative argument values.

As explained above, the argument types may comprise the argument types such as "device identifier", "function identifier" and optionally "parameter identifier". Other argument types may also be envisaged within the scope of the present invention.

For example, for the user, the database may store the identifiers of all the connected objects 10.1-10.4 (which are therefore alternative argument values) in association with the argument type "device identifier". No restriction is attached to the device identifier, which can be a numerical code or a character string, such as "bedroom light", "kitchen light", etc. All the possible functions (which are also alternative argument values) of the connected objects of the user are also stored in association with the argument type "function identifier". For example, the alternative functions "switch on", "switch off", "prepare a cappuccino", "prepare an expresso", "ring", etc, can be stored in association with the argument type "function identifier".

The database 13 also stores a compatibility mesh between the alternative argument values for a given type, and contextual data.

Then, from an argument type, alternative argument values can be obtained. By further providing contextual data, the alternative argument values can be filtered using the compatibility mesh. No restriction is attached to the format of the compatibility mesh. The compatibility mesh will be better understood when referring to FIGS. 3a to 3c and 4a to 4c.

Such a compatibility mesh can be configured by the user, for example using the user terminal 1 or any device that is adapted to access the database 13.

Alternatively, the compatibility mesh can be configurable by another person than the user (for example a parent in case the user is a child, or any person being entitled to manage the compatibility mesh of the user). The compatibility mesh may also be configurable by a manufacturer of some of the connected objects, or by the service platform 14.

The system illustrated on FIG. 1 is only provided for illustrative purposes. For example, the network used to control the connected objects 10.1-10.4 can be a local access network, such as a Bluetooth network for example, and, in that case, there is no need to access to a remote service platform.

Figure 2:
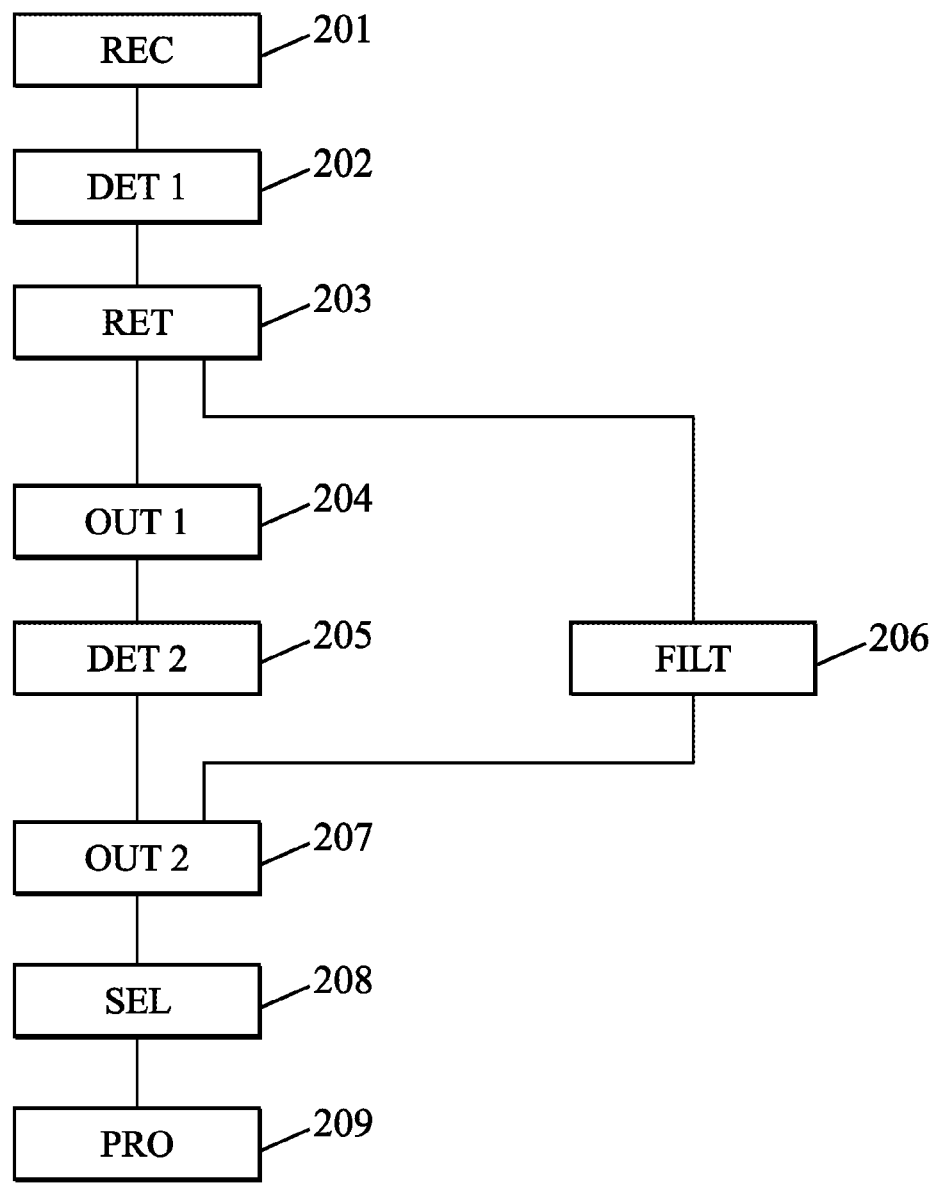
FIG. 2 is a flowchart illustrating the steps of a method according to some embodiments of the invention.

FIG. 2 is a diagram illustrating the steps of a method according to some embodiments of the invention.

At step 201, a first user input can be received through a user interface of the user terminal 1. No restriction is attached to the first user input, which can be a pronounced sentence acquired by a microphone and converted to text, or a character string input using a touch pad or a keyboard.

Based on the user input, at least one argument type is detected at step 202. In addition, contextual data can be retrieved from the user input or from an external sensor.

The contextual data can comprise at least one element among location of the user acquired by a sensor, acquired for example through a GPS of the user terminal, or acquired using the location of the access point to which the user terminal 1 accesses the network 12;

weather forecast data acquired via an application installed on the user terminal 1 for example; or temperature data acquired by a sensor of the user terminal 1, or acquired via the network 12; or other contextual data acquired by a sensor, retrieved from an external entity, input by the user or retrieved from a user profile.

Alternatively, and as explained hereafter, the database can comprise a compatibility mesh for each given argument type. In that case, the contextual data may comprise argument values of argument types others than the given argument type.

At step 203, the user terminal 1 may access the database 13 to retrieve the alternative argument values that correspond (i.e. that are associated with) the detected argument type. According to some embodiments, the user is identified/authenticated using any identification/authentication method (for example, the user terminal 1 sends a user identifier to the database 13), so that the alternative argument values are filtered using the user identifier. To this end, the database 13 stores the argument types, the alternative argument values, and the compatibility mesh, in association with respective user identifiers.

At step 204, the user terminal 1 may output, for example using a display, a graphical instruction representing the first user input, the graphical instruction comprising a selectable element representing the detected argument type.

At step 205, a second user input on the selectable element is detected. The second input is intended for selection of an alternative argument value. To this end, the second user input can be a click or a double click (or any other selection operation) using the user finger, using a mouse, using a press button, a rotatable wheel, etc, of the user terminal 10.

In parallel (meaning between step 204 and step 207), the retrieved alternative argument values can be filtered using the compatibility mesh stored in the database 13 and based on the contextual data. A list of one or several filtered alternative argument values is thereby obtained.

At step 207, the filtered alternative argument values are output (on a display of the user terminal 1 for example), each of the filtered alternative argument value being selectable by the user.

At step 208, a selection by the user of one argument value among the filtered alternative argument values is detected by the user terminal 1.

At step 209, an instruction is transmitted one of the connected objects or to a group of connected objects based on the selected argument value. No restriction is attached to the way a connected object or a group of connected object is selected. For example, the connected object can be identified in the first user input by means of a device identifier (first argument type). A group of object can also be selected by a device identifier value such as "all the lights", which then refer to lights 10.2-10.4. Alternatively, the instruction can be transmitted to all the connected objects of the user. Other methods of selecting one or several connected objects of the user can be envisaged. For example, the selection may also depend on contextual data. If the user is located in the bedroom, then a user input such as "switch off the light" is interpreted as being an instruction intended to the bedroom light 10.2.

In what follows, the example of a user terminal 1 comprising a touch screen is considered for illustrative purposes only.

Figure 3A:
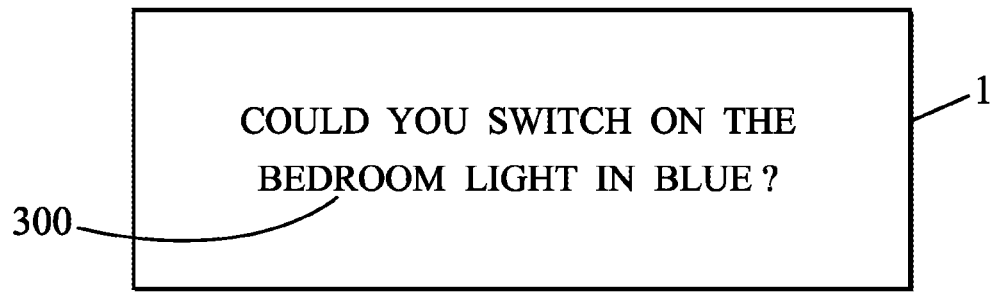
FIGS. 3*a* to 3*c* illustrate a graphical user interface of a user terminal according to a first embodiment of the invention.
Figure 3B:
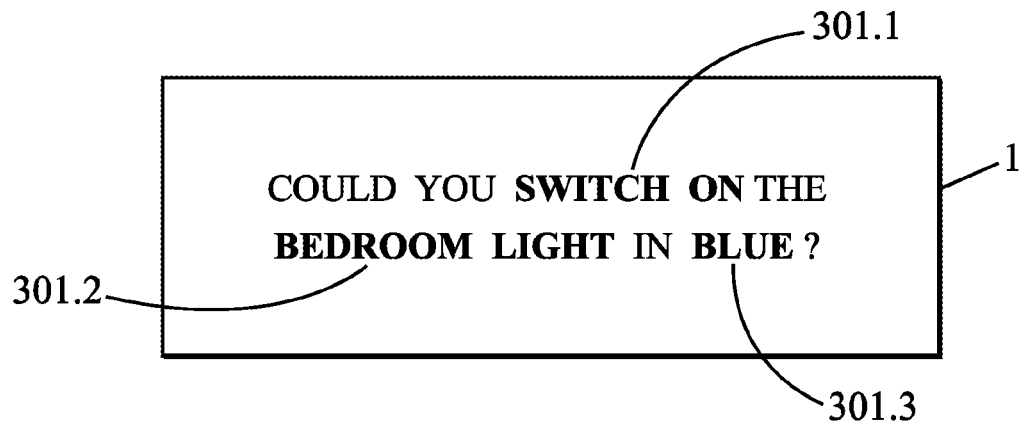
Figure 3C:
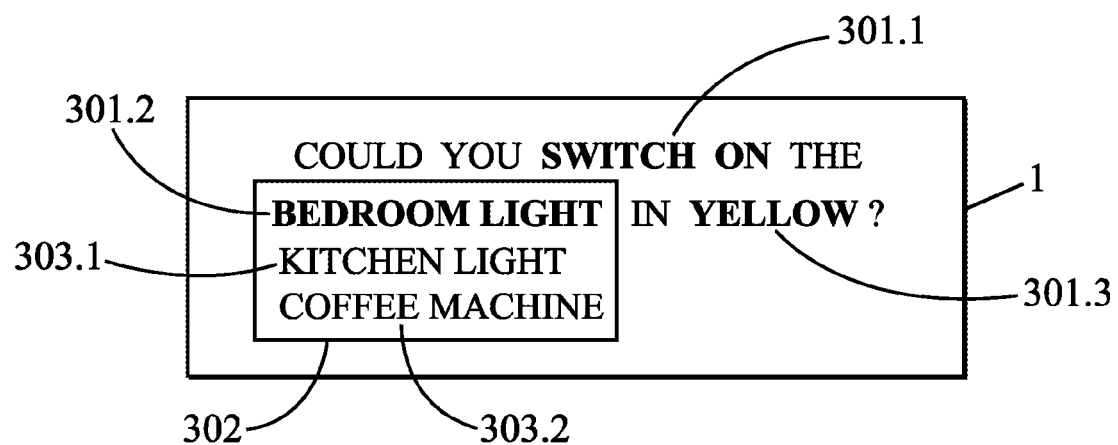

FIGS. 3a to 3c illustrate a user interface on the user terminal 1, according to a first embodiment of the invention.

As illustrated on FIG. 3a, the first user input can be displayed on the touch screen as a graphical instruction 300, while the user is typing it (or while the user is speaking in a microphone). In the specific example shown on FIGS. 3a to 3c, the first input "Could you switch on the bedroom light in blue?" is received by the user terminal 1.

After the acquisition of the first user input, argument types can be detected at step 202 as shown on FIG. 3b. In this example, three argument types having respective initial argument values are detected in the first input:
- a function identifier 301.1 having the initial argument value "switch-on";
- a device identifier 301.2 having the initial argument value "bedroom light";
- a parameter identifier 301.3 having the initial argument value "blue".

The user can validate the graphical instruction so that is it transmitted to the service platform 14 that controls the bedroom light 10.2 to be switch-on in blue. However, the graphical instruction 300 may comprise argument values that do not correspond to the argument values intended by the user (for example, some argument values of the instructions can result from an erroneous manipulation of the user). According to solutions of the prior art, the user has to reselect the erroneous argument values, to cancel them and then to input the right argument values, which is time consuming and not satisfactory.

To avoid this, as shown on FIG. 3c, upon detection of the argument type 301.2, alternative argument values can be retrieved by the user terminal 1 from the database 13. To this end, the user terminal looks for, in the database 13, all the alternative argument values that correspond to the argument type "device identifier", for the identified user. Then, the alternative argument values are filtered based on contextual data. In the present example illustrated on FIGS. 3a to 3c, the contextual data may be the location of the user. At step 202, it can be determined that the user is located at home: no restriction is attached to the way the user is located. For example, it can be detected that the user terminal is connected using the access point 11.1, which is located at home. Alternatively, the GPS of the user terminal can be used. Still alternatively, the user can indicate in the first user input that he is at home.

Based on this contextual data, the user terminal 1 can filter the alternative argument values from the compatibility mesh stored in the database 13. For example, in the compatibly mesh, the connected objects 10.1-10.3 can be compatible with the location "at home", whereas the connected objet 10.4 is only compatible with the location "in the car".

Therefore, the filtered alternative argument values only comprise "bedroom light", "kitchen light" and "coffee machine".

Then, the initial argument value 301.2 is displayed in the form of a selectable element. Upon selection of the selectable element, a window 302 is displayed, the window comprising the filtered alternative argument values only comprise "bedroom light" 301.2, "kitchen light" 303.1 and "coffee machine" 303.2.

Each of these filtered alternative argument values is then selectable by the user to generate an instruction to remotely control a connected object 10.1-10.2 located at home.

Figure 4A:
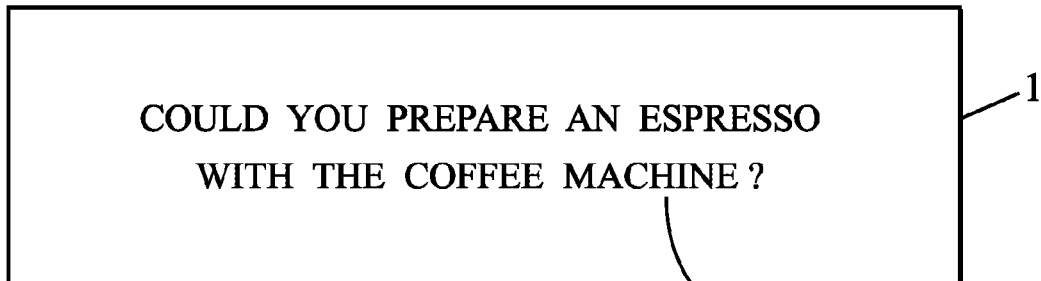
FIGS. 4*a* to 4*c* illustrate a graphical user interface of a user terminal according to a second embodiment of the invention.
Figure 4B:
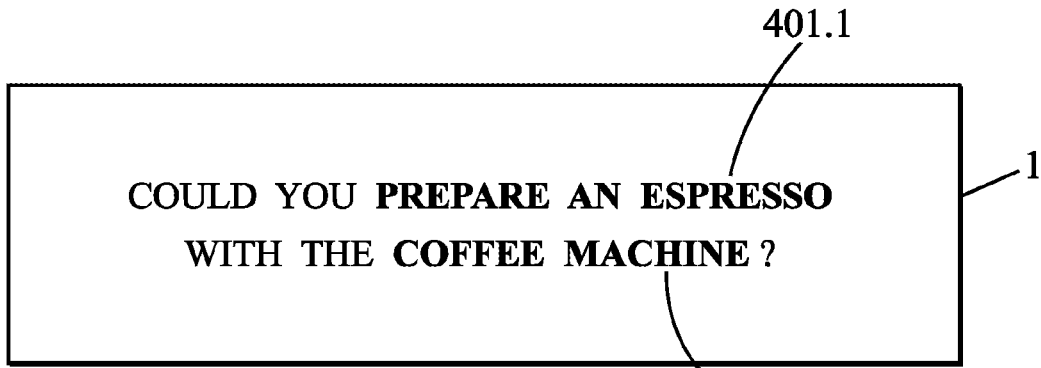
Figure 4C:
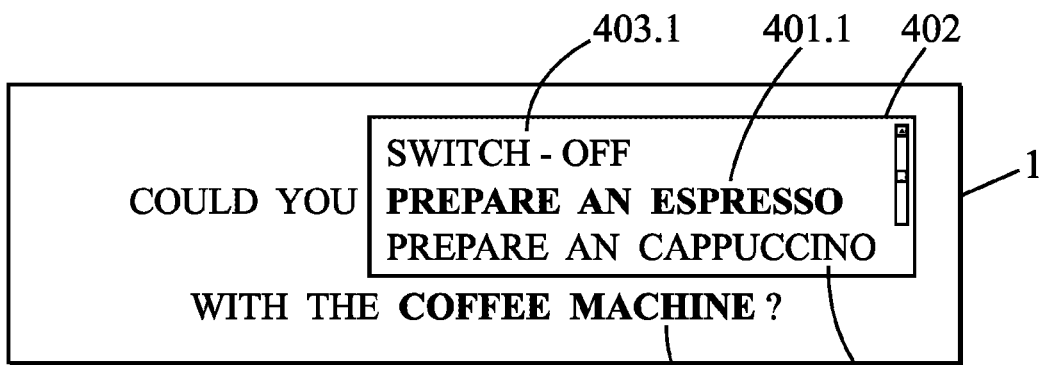

FIGS. 4a to 4c illustrate a user interface on the user terminal 1, according to a second embodiment of the invention.

As illustrated on FIG. 4a, the first user input can be displayed on the touch screen as a graphical instruction 400, while the user is typing it (or while the user is speaking in a microphone). In the specific example shown on FIGS. 4a to 4c, the first input "Could you prepare an espresso with the coffee machine?" is received by the user terminal 1.

After the acquisition of the first user input, argument types can be detected at step 202 as shown on FIG. 4b. In this example, two argument types having respective initial argument values are detected in the first input:
- a function identifier 401.1 having the initial argument value "prepare an espresso";
- a device identifier 401.2 having the initial argument value "coffee machine".

The user can validate the graphical instruction so that is it transmitted to the service platform 14 that controls the coffee machine 10.1 to prepare an espresso. However, the graphical instruction 400 may comprise argument values that do not correspond to the argument values intended by the user (for example, some argument values of the instructions can result from an erroneous manipulation of the user). According to solutions of the prior art, the user has to reselect the erroneous argument values, to cancel them and then to input the right argument values, which is time consuming.

To avoid this, as shown on FIG. 4c, upon detection of the argument type 401.1, alternative argument values can be retrieved by the user terminal 1 from the database 13. To this end, the user terminal looks for, in the database 13, all the alternative argument values that correspond to the argument type "function identifier", for the identified user. Then, the alternative argument values are filtered based on contextual data. In the present example illustrated on FIGS. 4a to 4c, the contextual data may be the other argument type 401.2 that identifies the device to be controlled (the coffee machine).

Based on this contextual data, the user terminal 1 can filter the alternative argument values from the compatibility mesh stored in the database 13. For example, in the compatibly mesh, some functions such as "switch off", "prepare an espresso", "prepare a cappuccino", etc, can be compatible with the other argument type "device identifier" having the value "coffee machine", whereas other functions such as "ring" (which can be stored in the database 13 for the identified user because he also has a connected alarm, for example) is not compatible with the other argument type "device identifier" having the value "coffee machine".

Therefore, the filtered alternative argument values comprise "switch off", "prepare an espresso", "prepare a cappuccino", and other functions that can be eventually performed by a coffee machine, but do not comprise other functions such as "ring" for example.

Then, the initial argument value 401.1 is displayed in the form of a selectable element. Upon selection of the selectable element, a window 402 is displayed, the window comprising the filtered alternative argument values comprise "switch off" 403.1, "prepare an espresso" 401.1, "prepare a cappuccino" 401.2 and optionally other functions that are not shown on FIG. 4c.

Each of these filtered alternative argument values is then selectable by the user to generate an instruction to control the coffee machine 10.1.

Providing a selectable element that proposes alternative argument values that are filtered enables to simplify and accelerate modification or correction of an instruction input by the user. In addition, taking into account contextual data enables to efficiently and relevantly perform the filtering of the alternative argument values.

Figure 5:
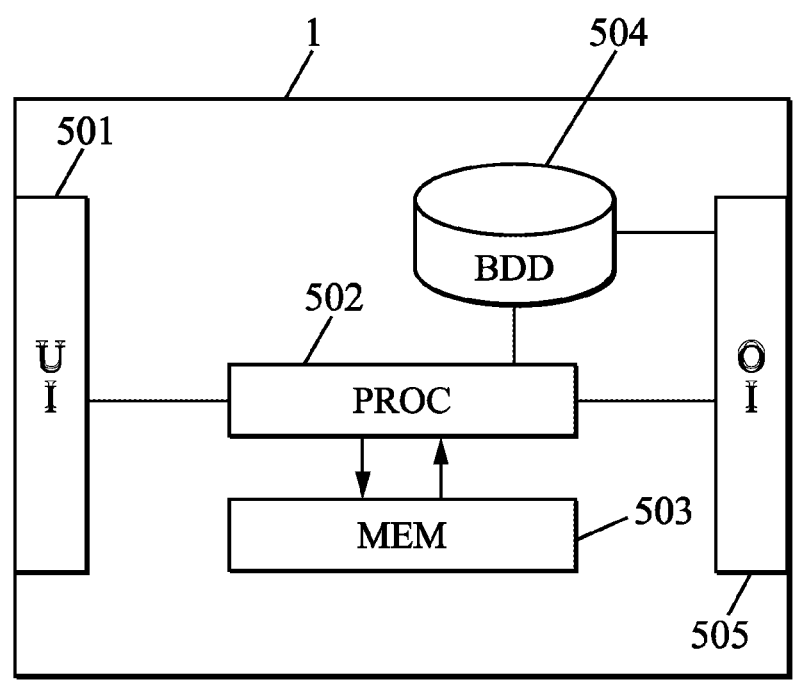
FIG. 5 illustrates a user terminal according to some embodiments of the invention.

FIG. 5 shows an electronic device 1 (or user terminal 1) according to some embodiments of the invention.

The user terminal 1 comprises a random access memory 503 and a processor 502 that can store instructions for performing the steps of a method as described above when referring to FIG. 2.

The user terminal 1 may also comprise a database 504 for storing data resulting from the method according to the invention. For example, the database 205 may store the data that are retrieved from the database 13 (associations between the argument types and the alternative argument values, compatibility mesh) and can store user identifiers. According to an embodiment, the database 13 can be stored in the user terminal, as database 504.

The user terminal 1 comprises a user interface 501 for receiving selections and user inputs by the user. The user interface 501 can for example comprise a touch display, a virtual or physical keyboard, press buttons, a camera and/or a microphone coupled to a speech-to-text application. The user terminal 1 also comprises a network interface 505 to communicate with the network 12 and in particular to transmit the user entries to the selected connected objects. The network interface can be a wired interface (Ethernet) or wireless (Bluetooth, 2G, 3G, 4G, Wi-fi, etc).

Although the present disclosure has been described with reference to one or more examples, workers skilled in the art will recognize that changes may be made in form and detail without departing from the scope of the disclosure and/or the appended claims.

The invention claimed is:

1. A method for managing a remote electronic device using a user interface on an electronic device, the electronic device being operatively connected to a database associating argument types with alternative argument values, said database further comprising a compatibility mesh, said compatibility mesh being a data structure linking alternative argument values for a given type and contextual data that are compatible together, the method comprising:
   upon reception of a first user input of an initial instruction through the user interface on the electronic device, detecting at least one argument type in said first user input and contextual data, each of said detected argument types having an initial argument value in the initial instruction;
   for at least one of the detected argument types in the initial instruction, retrieving from the database the alternative argument values, which include the initial argument value and at least one alternative to the initial argument value and corresponding to the same detected argument type;
   filtering the alternative argument values for the at least one detected argument type using the compatibility mesh and the contextual data;
   outputting a graphical instruction representing the first user input, said graphical instruction comprising for the at least one of the detected argument types in the first user input a selectable element representing the detected argument type;
   upon detection of a second user input on the selectable element for selection of an alternative argument value, outputting in the graphical instruction the filtered alternative argument values;
   receiving a selection of an argument value among the filtered alternative arguments values to produce a final instruction; and
   providing the final instruction to the remote electronic device based on the selected argument value;
   wherein the at least one detected argument type is detected among the following argument types: a device identifier, a function identifier or a parameter identifier.

2. The method according to claim 1, wherein the contextual data comprises information acquired by at least one sensor, information input by the user or information retrieved from an external entity.

3. The method according to claim 2, wherein the contextual data comprises at least one among:
   location data of the user;
   weather forecast data;
   temperature data; or
   other information acquired by a sensor, retrieved from an external entity or communicated by the user.

4. The method according to claim 1,
   wherein the at least one detected argument type comprises a first argument type, which is a device identifier, and the database further stores access rights of users for the alternative argument values of the first argument type,
   wherein, in response to the first argument type being detected in the first user input, the method further comprises identifying the user,
   wherein the graphical instruction comprises a selectable element representing the detected first argument type; and
   wherein the retrieved alternative argument values are filtered using the compatibility mesh, the contextual data and the access rights of the identified user.

5. The method according to claim 1,
wherein, in the compatibility mesh between the alternative argument values for a given type and contextual data, the contextual data comprises argument values of another argument type;
wherein upon reception of the first user input, at least a first argument type and a second argument type are detected with contextual data, and wherein the method further comprises obtaining a first argument value for the first argument type;
wherein alternative argument values corresponding to the second argument type are retrieved;
wherein the graphical instruction comprises the first argument value and a selectable element representing the detected second argument type; and
wherein the retrieved alternative argument values are filtered using the compatibility mesh for the second argument type and the contextual data.

6. The method according to claim 5, wherein the first argument type is a device identifier identifying the remote electronic device, and wherein the second argument type is a function identifier or a parameter identifier.

7. The method according to claim 5, wherein a third argument type is detected in the first user input, and wherein the second argument type is a function identifier and the third argument type is a parameter identifier.

8. The method according to claim 1, wherein the compatibility mesh is configurable by the user.

9. A non-transitory computer readable storage medium comprising a computer program product stored thereon comprising computer program instructions loadable into a computing device of an electronic device and adapted to, when loaded into and executed by said computing device, cause the computing device to perform a method for managing a remote electronic device using a user interface on the electronic device, the electronic device being operatively connected to a database associating argument types with alternative argument values, said database further comprising a compatibility mesh, said compatibility mesh being a data structure linking alternative argument values for a given type and contextual data that are compatible together, the method comprising:
  upon reception of a first user input of an initial instruction through the user interface on the electronic device, detecting at least one argument type in said first user input and contextual data, each of said detected argument types having an initial argument value in the initial instruction;
  for at least one of the detected argument types in the initial instruction, retrieving from the database the alternative argument values, which include the initial argument value and at least one alternative to the initial argument value and corresponding to the same detected argument type;
  filtering the alternative argument values for the at least one detected argument type using the compatibility mesh and the contextual data;
  outputting a graphical instruction representing the first user input, said graphical instruction comprising for the at least one of the detected argument types in the first user input a selectable element representing the detected argument type;
  upon detection of a second user input on the selectable element for selection of an alternative argument value, outputting in the graphical instruction the filtered alternative argument values;
  receiving a selection of an argument value among the filtered alternative arguments values to produce a final instruction; and
  providing the final instruction to the remote electronic device based on the selected argument value;
  wherein the at least one detected argument type is detected among the following argument types: a device identifier, a function identifier or a parameter identifier.

10. An electronic device for managing a remote electronic device using a user interface on the electronic device, the electronic device being operatively connectable to a database associating argument types with alternative argument values, said database further comprising a compatibility mesh, said compatibility mesh being a data structure linking alternative argument values for a given type and contextual data that are compatible together, the electronic device comprising:
  a user interface for receiving user inputs;
  a processor configured to perform the following acts:
    upon reception of a first user input of an initial instruction through the user interface on the electronic device, detecting at least one argument type in said first user input and contextual data, each of said detected argument types having an initial argument value in the initial instruction;
    for at least one of the detected argument types in the initial instruction, retrieving from the database the alternative argument values, which include the initial argument value and at least one alternative to the initial argument value and corresponding to the same detected argument type;
    filtering the alternative argument values for the at least one detected argument type using the compatibility mesh and the contextual data;
    outputting a graphical instruction representing the first user input, said graphical instruction comprising for the at least one of the detected argument types in the first user input a selectable element representing the detected argument type;
    upon detection of a second user input on the selectable element for selection of an alternative argument value, outputting in the graphical instruction the filtered alternative argument values;
    receiving a selection of an argument value among the filtered alternative arguments values to produce a final instruction; and
    providing the final instruction to the remote electronic device based on the selected argument value;
    wherein the at least one detected argument type is detected among the following argument types: a device identifier, a function identifier or a parameter identifier.

11. A system comprising the electronic device according to claim 10 and the database associating argument types with alternative argument values, said database further comprising the compatibility mesh.

* * * * *